United States Patent Office 3,480,511
Patented Nov. 25, 1969

3,480,511
ENZYMATIC BREAKER SYSTEM FOR TAMARIND POLYSACCHARIDE
Duane A. Jones, Minneapolis, Minn., assignor to General Mills, Inc., a corporation of Delaware
No Drawing. Filed Aug. 11, 1966, Ser. No. 571,717
Int. Cl. C12b 1/00; C12k 1/00
U.S. Cl. 195—31       11 Claims

ABSTRACT OF THE DISCLOSURE

This invention relates to enzymatic degradation of the polysaccharide present in the tamarind seed kernel by using a proteolytic enzyme of fungal origin derived from the *Aspergillus orzyaeniger* group. An enzyme degraded polysaccharide finds utility in the oil drilling industry and in the preparation of gelling agents.

---

This invention is directed to the enzymatic degradation of the polysaccharide present in the tamarind seed kernal. Tamarind is a gum derived from the fruit of *Tamarindus indicus* L., Leguminosae, grown principally in the East and West Indies and Africa. It has been discovered that a proteolytic enzyme of fungal origina derived from the *Aspergillus orzyaeniger* group, known and used primarily for its protease activity, is remarkably effective in the degradation (depolymerization) of tamarind polysaccharide. The invention finds utility in gum sols used in the petroleum industry and pumped down-hole. The invention also finds utility in the preparation of jelling agents for use in jelly making in substitution for pectins and similar materials.

Malt diastase and Taka diastase have been used for the enzymatic degradation of tamarind polysaccharide. However, on the basis of reported data neither of these enzyme systems appears to be particularly efficient. Specifically, malt diastase is reported to require three days for the degradation of tamarind polysaccharide, as determined by the reducing sugars content, while Taka diastase is reported to require two days. However, tests which utilized viscosity measurements shown Taka diastase to have little effect on tamarind polysaccharide unless used at relatively high levels.

In contrast, the proteolytic enzyme system used in the present invention has been found to be very effective in the rapid degradation of tamarind polysaccharide. Substantial degradation takes place in a matter of hours, generally less than a day. Preferably, the mixture of polysaccharide and enzyme is maintained for at least one hour for substantial degradation to occur. At the same time it is less costly than malt diastase or Taka diastase on a pound-for-pound basis. The economic advantage, however, is even greater because the enzyme system used in the present invention can be at materially lower concentrations. Furthermore, the proteolytic enzyme system used in the present invention has been found to function satisfactorily in the presence of high concentrations of electrolytes as, for example, saturated brine, and is effective over an unusually wide pH range from about 4 to 9 permitting use of the enzyme system under diverse reaction conditions.

The enzyme compositions employed in this invention are of fungal origin. By the preferred procedure, the microorganism that may be selected from the *Aspergillus oryzae-niger* group, or from a species of Aspergillus such as *Aspergillus oryzae*, e.g. such as the microorganism filed in the American Type Culture Collection in Washington, D.C. under catalogue No. 14,605, is grown on a moist nutrient medium. Suitable media include crushed or broken grain from which, preferably, part of the starchy material has been removed, including brans, shorts and middlings, preferably from wheat, at temperatures from 15° to 35° C. and preferably between 20 to 30° C. In addition to wheat products, there may be used materials from rice, corn, oats, barley and the like, while there may be added to such materials if desired, fatty glycerides, such as olive oil, linseed oil, shark oil, etc. or seeds with high oil content such as soya bean.

Nutrient media are prepared by mixing the crushed or broken grain in the water. Mixtures containing from 45% to 65% moisture are generally suitable depending upon the specific materials used. It is advisable, though not essential, to sterilize the mixture by heating to eliminate bacteria and fungi which may chance to be present. The mixture is then inoculated with a heavily spored culture of the microorganism, preferably 0.01 to 0.10 of the culture medium by weight, and the inoculated medium maintained within the temperature range specified for about 48 to 144 hours until an enzyme composition can be separated that has the desired activity as measured by standard procedures which are discussed in greater detail hereinafter.

After an enzyme composition of desired activity has been obtained, growth is interrupted by drying the medium, preferably below 60° C. Alternatively the medium may be extracted and the extract used as the source of the enzyme composition. Alternatively the enzymes present in the extract may be precipated as by the addition of a water miscible, volatile, organic solvent such as ethyl alcohol, isopropanol or acetone. The precipitated product may be dried, if desired particularly when it is to be stored.

More detailed descriptions for the preparation of enzymes are shown in "Enzyme Technology" in "The Enzymes" Part 2, vol. II (1952) and in "Economic Botany," vol. 5, No. 2, pages 126–144 (1951) in an article entitled "Microbiological Production of Enzymes and Their Industrial Applications." Convenient sources for fungal enzymes are shown in such art.

Typical enzyme compositions of single strength activity suitable for the purpose of this invention may be characterized as preferably having the following minimum activities.

The enzyme compositions of single strength have a proteolytic activity as measured by its casein activity of not less than 2,000 units per gram; as measured by its hemoglobin activity of not less than 10,000 units per gram, and as measured by its gelatin viscosity activity of not less than 25,000 units per gram.

An enzyme composition has a casein activity of 1,000 units if 200 milligrams produce 69.4 milligrams soluble nitrogen, or if it solubilizes 750 milligrams of casein in one hour at 40° C. at a pH of 8.

Hemoglobin unit activity is defined in J.A.O.A.C. 44, 344 (1961).

Gelatin viscosity units are defined as 36 units causing a reduction of 50% in viscosity of a 6% gelatin solution (225 Bloom) in 30 minutes at 40° C. at a pH of 7 (Koch and Ferrari, Cereal Chemistry 32,254 (1955)).

The enzyme compositions used in this invention also have an amylolytic activity as measured by the Sandstedt, Kneen and Blish Test, commonly called the SKB Test (Cereal Chemistry 16,712 (1939) Sandstedt, Kneen and Blish) of not less than 100 units per gram; and of not less than 500 starch liquefication units per gram as determined by the method of Borgpetty and Taylor in an article entitled "De-Sizing Procedure in Relation to Enzyme Activity" in American Dyestuffs, vol. 44, No. 8, page 256 (1955).

The lipase activity of these enzyme compositions as measured by a simplified Triacetin Method (Jour. Bio. Chem., 122, 125 (1937) Balls, Matlach and Tucker) is not less than 20 units per gram.

Additional enzymatic activities are natural to such enzyme compositions and are concurrently present.

Finally, enzyme compositions suitable for use in this invention preferably have a ratio of casein unit activity to hemoglobin unit activity of not less than 1:3 and a ratio of SKB unit activity to starch liquefaction unit activity of not less than 1:2.

An enzyme product having these characteristics may be obtained from the Rohm & Haas Company of Philadelphia, Pa., and is sold commercially under the tradename Rhozyme P-11. Similar products may be obtained from other commercial sources. Rhozyme P-11 is characterized by a proteolytic activity of approximately 10,000 casein units per gram, about 40,000 hemoglobin units per gram and about 100,000 gelatin viscosity units per gram. It has an amylolytic actvity of approximately 150 SKB units per gram and 850 starch liquefaction units per gram. Its lipase activity as measured by the Triacetin Method is approximately 25 units per gram. It is available as a dry free-flowing powder having high uniformity and excellent storage stability.

The enzyme compositions are standardized in accordance with procedures discussed and the standardized material may be referred to as single strength. As it is more practical to use a high activity material, these enzymes are generally used at a higher activity than single strength, for example, a factor of 3 or 4 times the single strength material may be used. Where the enzyme activity is less than the single strength, the amount employed is increased in proportion to the decreased activity. Enzyme compositions of greater activity may be employed and when used the amounts as employed are in proportion to the increased activity. Rhozyme P-11 is available both in standardized form and as a concentrate having an activity factor range of from 4.0 to 6.5.

While the useful enzyme systems possess diastase activity which is effective in the degradation of tamarind polysaccharide, the diastase activity is normally low. Because such enzymes are used primarily for their protease activities, commercial preparations of enzymes are standardized with a protein, in this case casein. While commercial lots of enzymes vary somewhat in their diastase activity, testing has shown that the differences between different commercial lots are not great and all lots tested have been of approximately equal effectiveness in degrading tamarind.

Under optimum conditions the enzyme may be used at levels as low as 0.05 percent basis the dry tamarind polysaccharide. In most instances, however, a concentration of 0.10 is used. Under exacting conditions, such as pH extremes or in the presence of high concentrations of electrolytes, higher levels of enzyme up to 0.30 percent are used. These concentrations are of single strength standardized enzyme compositions. Where concentrated enzyme materials are used, the proportions are reduced accordingly.

Two types of tamarind are available. One is water insoluble. The other has been rendered water-soluble. When using the water insoluble grade the enzyme must not be added until after the tamarind sample has been dispersed, heated to promote hydration (solution) and cooled to below 50° C. because addition of enzyme prior to heating would result in thermal destruction of the enzyme. For the water-soluble grade of tamarind the enzyme may be dry-mixed with the tamarind prior to dispersion, or the enzyme may be added after dispersion of the gum. In the latter instance the enzyme may be added either as a dry powder or as a water solution to the dispersed gum solution.

The use of the particular enzyme for the degradation of tamarind as well as comparison of effectiveness with other enzymes, and use of depolymerized tamarind in jelly preparation, are illustrated in the following examples:

EXAMPLE I

Degradation of water insoluble grade tamarind

A 3 percent dispersion of a water insoluble grade of tamarind was prepared by agitation in a blending apparatus operated at moderate shear rate. The dispersion was heated to 80° C. with stirring. Heating was continued at this level for ten minutes and the dispersion was then cooled to 25° C. A freshly prepared one percent solution of enzyme (Rhozyme P-11) was added to the cooled tamarind solution. The enzyme was added in amount to produce an enzyme concentration of 0.20% relative to the dry tamarind. The viscosity of the solution was determined as a function of time from the point of enzyme addition. A control dispersion of tamarind without added enzyme was prepared and evaluated for comparison purposes. Results were as follows:

| Sample | Viscosity (Brookfield) in cps. at (hrs.)— | | | | | | |
|---|---|---|---|---|---|---|---|
| | ¼ | ½ | 1 | 2 | 4 | 6 | 24 |
| 0.2% enzyme | 1,445 | 1,450 | 1,225 | 875 | 620 | 380 | 60 |
| Control | 1,550 | 1,620 | 1,550 | 1,490 | 1,405 | 1,345 | 1,245 |

EXAMPLE II

Degradation of water soluble grade tamarind

One part by weight of dry enzyme powder (Rhozyme P-11) was mechanically dry mixed with 1000 parts by weight of a water soluble grade of tamarind by shaking and sieving. A 2% dispersion of this mixture in distilled water was prepared in a blending apparatus operated at a moderate shear rate. The enzyme concentration was 0.10% based on the dry tamarind. The viscosity of the mixture was determined as a function of time from the time of dispersion. A control without enzyme was prepared and evaluated for comparison purposes. Results were as follows:

| Sample | Viscosity (Brookfield) in cps. at (hrs.)— | | | | | | |
|---|---|---|---|---|---|---|---|
| | ¼ | ½ | 1 | 2 | 4 | 6 | 24 |
| 0.1% enzyme | 1,375 | 1,255 | 975 | 665 | 375 | | 40 |
| Control | 1,410 | 1,395 | 1,380 | 1,355 | 1,260 | 1,215 | 915 |

EXAMPLES III, IV AND V

Degradation of water-soluble grade tamarind polysaccharide in the presence of electrolytes Two 3% solutions of a water soluble grade tamarind were prepared as follows: saturated brine containing 26% sodium chloride and 1½% calcium chloride (Example III) and synthetic hard water containing 8% sodium chloride and 2.5% calcium chloride (Example IV). A 2% solution of highly purified tamarind was prepared in distilled water containing 7.5% technical borax (Example V). A 3% solution of water soluble tamarind in distilled water was prepared as a control. A solution of enzyme (Rhozyme P-11) was added to each of these at the time of dispersion. The enzyme level was 0.20% based on the dry tamarind in each case. The viscosities of these solutions were determined as a function of time from the time of dispersion. Viscosity results are as follows:

| Solvent system | pH | ¼ hr. | ½ hr. | 1 hr. | 2 hrs. | 4 hrs. | 6 hrs. | 24 hrs |
|---|---|---|---|---|---|---|---|---|
| Distilled water | 5.8 | 1,445 | 1,450 | 1,225 | 875 | 620 | 380 | 60 |
| Saturated brine | 7.4 | 1,440 | 1,720 | 1,660 | 1,395 | 925 | 550 | 83 |
| Hard water | 5.0 | 1,920 | 2,030 | 1,705 | 1,635 | 1,420 | 1,215 | 570 |
| Dist. water+7.5% borax | 9.0 | 16,000 | 15,600 | 14,500 | 13,400 | | | 3,400 |

EXAMPLE VI

Comparison of effect of Taka diastase and Rhozyme P-11 on tamarind

A 2% solution of crude tamarind (w./w.) in distilled water was prepared and divided into three parts. One of these was used as a control. To another 0.1% of Taka diastase was added and to the third 1.0% Taka diastase was added. Viscosity was determined with a Brookfield Synchro-Lectric viscometer, Model RVT, at 40° C. as a function of time from the time of dispersion. The results are as follows:

| mple | Viscosity (cps.) 2 at (hrs.)— | | | | | |
|---|---|---|---|---|---|---|
| | ½ | 1.0 | 2.0 | 4.0 | 6.0 | 24.0 |
| Control | 980 | 880 | 765 | 680 | 660 | 360 |
| 0.1% enzyme | 949 | 830 | 750 | 650 | 630 | 330 |
| 1.0% enzyme | 950 | 780 | 560 | 440 | 360 | 100 |

The greater effectiveness of Rhozyme P-11 at lower concentrations is illustrated by comparison with the following samples. Three 2.0% (w./w.) solutions of partially purified tamarind were prepared in distilled water. One of these served as a control. To another 0.05% Rhozyme P-11 enzyme based on dry tamarind was added and to the third 0.10% Rhozyme P-11 was added. Viscosity was measured on the same viscometer at 25° C. as a function of time from time of dispersion. The results were as follows:

| ample | Viscosity (cps.) 2 at (hrs.)— | | | | | | |
|---|---|---|---|---|---|---|---|
| | ¼ | ½ | 1.0 | 2.0 | 4.0 | 6.0 | 24.0 |
| Control | 1,410 | 1,395 | 1,380 | 1,355 | 1,260 | 1,215 | 915 |
| 0.05% enzyme | 1,525 | 1,295 | 1,280 | 940 | 639 | | 90 |
| 0.10% enzyme | 1,375 | 1,255 | 975 | 665 | 375 | | 40 |

EXAMPLES VII, VIII AND IX

Effect of various enzyme samples on tamarind

Four 3% (w./w.) dispersions of purified tamarind in distilled water were prepared. To the first of these a standard single strength enzyme mix was added in concentration of 0.10% basis the tamarind (Example VII). The single strength mixture was prepared from a Rhozyme P-11 concentrate by dilution with salt to 10,000 casein solubility units per gram, as heretofore identified. To the second tamarind dispersion (Example VIII) Rhozyme P-11 concentrate having a protease activity factor of 6.33 was added at a concentration of 0.0157% basis the tamarind sample, equivalent to 0.10% of single strength enzyme. To the third dispersion (Example IX) Rhozyme P-11 concentrate having a protease activity factor of 5.75 was added at a concentration 0.0175% basis the dry tamarind, equivalent to 0.10% single strength enzyme. The fourth enzyme dispersion was left free from enzyme as a control. Viscosity was determined as a function of time measured from the time of dispersion. The results are as follows:

| Enzyme Sample | Viscosity (cps.) at (hrs.)— | | | | | | |
|---|---|---|---|---|---|---|---|
| | ¼ | ½ | 1.0 | 2.0 | 4.0 | 6.0 | 24.0 |
| Example VII | 5,245 | 5,150 | 4,525 | 3,575 | 2,175 | 1,625 | 150 |
| Example VIII | 5,450 | 5,375 | 4,975 | 4,050 | 2,825 | 2,150 | 300 |
| Example IX | 5,700 | 5,550 | 5,100 | 4,275 | 3,060 | 2,300 | 300 |
| Control | 6,025 | 6,150 | 6,175 | 6,100 | 5,875 | 5,750 | 4,850 |

EXAMPLE X

Preparation of jelly grade tamarind

Depolymerized tamarind useful for making sugar jellies has been prepared as follows: 36 parts by weight of partially purified tamarind containing 5.1% protein was suspended in 1164 parts of distilled water and heated to 80° C. with stirring. This suspension was maintained at 80° C. for ten minutes and then cooled to 50° C. An aqueous solution of enzyme concentrate (Rhozyme P-11; having an activity factor of 5.75) in distilled water was added to the tamarind suspension. The enzyme concentration was 0.48% and usage level 0.20% basis the gum. The reaction mixture was thermostated at 50° C. until the viscosity of the solution (as determined using a Brookfield model RVT viscometer with No. 1 spindle at 20 r.p.m.) diminished to 50 cps. The time required for this was about 90 minutes. The mixture was centrifuged to remove insolubles, filtered, diluted with two volumes of USP ethanol, filtered again, dried and ground to a powder. The yield was 25 parts by weight (70%) of dry powder. The analysis of this powder shows: protein 1.05%, moisture 8.9%, fat 0.0%, fiber 0.53% and ash 0.65%.

EXAMPLE XI

Preparation of tamarind-sugar jelly

A tamarind-sugar jelly was prepared by suspending 0.54 part by weight of enzyme depolymerized tamarind prepared according to Example X in a hundred parts of water. Sixty-five parts of sucrose were added and the solution boiled down to 122 parts by weight. One part of a 50% citric acid solution (w./w.) was added. The solution was poured into a jelly mold and put aside to set-up. The set jelly (54% solids) was comparable in gel strength and texture to a pectin jelly of 65% solids content.

The embodiments of the present invention in which an exclusive property or privilege is claimed are defined as follows:

1. A method of degrading tamarind polysaccharide which comprises incorporating into an aqueous suspension of tamarind gum an enzyme product of a microorganism from the *Aspergillus oryzae niger* group said enzyme product having a proteolytic activity of not less than about 2,000 casein units per gram, not less than 10,000 hemoglobin units per gram, not less than 25,000 gelatin viscosity units per gram, an amylolytic activity of not less than 100 SKB units per gram, not less than 500 starch liquifaction units per gram, and a lipase activity of not less than 20 units per gram, and maintaining said mixture for a period of time sufficient for substantial degradation of the gum polysaccharide.

2. A method as defined in claim 1 wherein said period of time is less than 24 hours.

3. A method as defined in claim 1 in which said enzyme product is produced by inoculating a moist nutrient medium with a heavily sporulated culture of a microorganism from the *Aspergillus oryzae-niger* group and maintaining said inoculated medium at a suitable temperature for a suitable period of time and separating these from an enzyme product having a proteolytic activity of not less than about 2,000 casein units per gram, not less than 10,000 hemoglobin units per gram, and not less than 25,000 gelatin viscosity units per gram, and having an amylolytic activity of not less than 100 SKB units per gram and not less than 500 starch liquifaction units per gram and characterized by having a ratio of casein unit activity to hemoglobin unit activity of not less than 1:3 and a ratio of SKB unit activity to starch liquifaction unit activity of not less than 1:2.

4. A method according to claim 1 further characterized in that said enzyme is initially present in said suspension in the amount from about 0.05 percent to about 0.30 percent based on dry tamarind saccharide present and based upon enzyme product of single strength activity.

5. A method according to claim 1 further characterized in that said suspension of tamarind and enzyme is maintained at a temperature below about 50° C.

6. A method according to claim 1 further characterized in that:
  (A) said tamarind gum is water insoluble,
  (B) said gum is dispersed in water and heated to promote hydration,
  (C) the resulting solution is cooled to below about 50° C., and (D) said enzyme is added to said cooled solution.

7. A method according to claim 1 further characterized in that:
(A) said tamarind gum is water soluble,
(B) said enzyme is admixed with said gum in the dry state, and
(C) said dry mixture of gum and enzyme is suspended in water.

8. A method according to claim 1 further characterized in that:
(A) said tamarind gum is water soluble,
(B) said gum is dispersed in water,
(C) said enzyme is dispersed in water, and
(D) said gum and enzyme dispersions are admixed.

9. A method according to claim 1 further characterized in that said enzyme product is prepared by inoculating said nutrient medium with a culture of *Aspergillus oryzae* and separating a product having a proteolytic activity of about 10,000 casein units per gram, about 40,000 hemoglobin units per gram and about 100,000 gelatin viscosity units per gram and having an amylolytic activity of about 150 SKB units per gram and about 850 starch liquifaction units per gram.

10. A method according to claim 1 further characterized in that said enzyme product is prepared by inoculating said nutrient medium with a culture of *Aspergillus niger* and separating a product having a proteolytic activity of about 10,000 casein units per gram, about 40,000 hemoglobin units per gram and about 100,000 gelatin viscosity units per gram and having an amylolytic activity of about 150 SKB units per gram and about 850 starch liquifaction units per gram.

11. A method according to claim 1 further characterized in that said dispersion of substantially degraded gum polysaccharide is dried.

References Cited

Whistler, Industrial Gums, pp. 489–491, Academic Press, New York 1959.

ALVIN E. TANENHOLTZ, Primary Examiner

U.S. Cl. X.R.

99—129; 195—62; 252—8.5